(12) United States Patent
Koon et al.

(10) Patent No.: US 8,793,036 B2
(45) Date of Patent: Jul. 29, 2014

(54) TRACKLESS TRANSIT SYSTEM WITH ADAPTIVE VEHICLES

(75) Inventors: Phillip L. Koon, Huntsville, AL (US); Gentry B. Stephens, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 842 days.

(21) Appl. No.: 12/887,746

(22) Filed: Sep. 22, 2010

(65) Prior Publication Data
US 2012/0072051 A1 Mar. 22, 2012

(51) Int. Cl.
*G05D 1/00* (2006.01)
*G05D 3/00* (2006.01)
*G06F 7/00* (2006.01)
*G06F 17/00* (2006.01)

(52) U.S. Cl.
USPC .......... 701/2; 701/1; 701/23; 701/24; 701/25; 701/36; 701/117; 701/414; 701/422; 701/482; 701/301

(58) Field of Classification Search
USPC ................ 701/1, 2, 23, 24, 25, 36, 117, 32.3, 701/32.4, 400, 408, 410, 412, 414, 418, 701/420, 422, 482, 300, 301
See application file for complete search history.

(56) References Cited

U.S. PATENT DOCUMENTS

| | | | | |
|---|---|---|---|---|
| 5,390,125 A * | 2/1995 | Sennott et al. | ................ | 701/472 |
| 5,448,479 A * | 9/1995 | Kemner et al. | ................ | 701/23 |
| 5,469,356 A * | 11/1995 | Hawkins et al. | ................ | 701/48 |
| 5,956,250 A * | 9/1999 | Gudat et al. | ................ | 701/26 |
| 6,370,452 B1 * | 4/2002 | Pfister | ................ | 701/23 |
| 6,895,301 B2 * | 5/2005 | Mountz | ................ | 700/215 |
| 6,950,722 B2 * | 9/2005 | Mountz | ................ | 700/214 |
| 8,381,982 B2 * | 2/2013 | Kunzig et al. | ................ | 235/462.08 |
| 8,392,065 B2 * | 3/2013 | Tolstedt et al. | ................ | 701/41 |
| 2001/0044697 A1* | 11/2001 | Kageyama | ................ | 701/301 |
| 2004/0193363 A1* | 9/2004 | Schmidt et al. | ................ | 701/200 |
| 2005/0247513 A1* | 11/2005 | Turner | ................ | 180/444 |
| 2006/0184013 A1* | 8/2006 | Emanuel et al. | ................ | 600/426 |
| 2006/0210115 A1* | 9/2006 | Nemet | ................ | 382/104 |
| 2008/0051984 A1* | 2/2008 | Wurman et al. | ................ | 701/200 |
| 2008/0059015 A1* | 3/2008 | Whittaker et al. | ................ | 701/23 |

(Continued)

OTHER PUBLICATIONS

Website entitled "http://www.sky-trax.com/solutions/sky-trax-system/" 1 page, obtained from the website on Sep. 20, 2010.

*Primary Examiner* — Khoi Tran
*Assistant Examiner* — Jaime Figueroa
(74) *Attorney, Agent, or Firm* — Hope Baldauff, LLC (57) ABSTRACT

Technologies are described herein for providing a trackless transit system and controlling adaptive trackless vehicles within that system. Aspects include an autonomous vehicle transit system for controlling vehicle movement of trackless vehicles in the transit system. The system includes a command, control and orchestration system (CCOS) and vehicle controllers. Each vehicle controller is associated with a trackless vehicle and communicates a current location to the CCOS, receives a navigation command, and controls the trackless vehicle according to the navigation command. Further, the CCOS provides navigation commands to the vehicle controllers to control movements of the trackless vehicles within the transit system according to vehicle position information received from the vehicle controllers. According to embodiments, a trackless vehicle may be switched between a driver controlled mode in which the vehicle is controlled by a driver and a system controlled mode in which the vehicle is controlled by the CCOS.

20 Claims, 6 Drawing Sheets

(56) References Cited

U.S. PATENT DOCUMENTS

| | | |
|---|---|---|
| 2008/0234930 A1* | 9/2008 | Cheok et al. .................. 701/207 |
| 2009/0198400 A1* | 8/2009 | Allard et al. ..................... 701/23 |
| 2009/0313095 A1* | 12/2009 | Hurpin ............................ 705/13 |
| 2009/0319096 A1* | 12/2009 | Offer et al. ........................ 701/2 |
| 2010/0063663 A1* | 3/2010 | Tolstedt et al. ................. 701/23 |
| 2010/0256852 A1* | 10/2010 | Mudalige ........................ 701/24 |
| 2011/0010023 A1* | 1/2011 | Kunzig et al. .................... 701/2 |
| 2011/0030537 A1* | 2/2011 | Mullen .......................... 89/1.11 |

* cited by examiner

TRACKLESS TRANSIT SYSTEM WITH ADAPTIVE VEHICLES

BACKGROUND

Mass transit systems are used in many locations around the world to move passengers from place to place in a controlled environment. Examples include, but are not limited to, subways, trams, and trains. Conventional mass transit systems commonly utilize tracks or some similar guiding mechanisms to control the movement of the vehicle between designated stops. Doing so provides for fixed routes in which multiple tracked vehicles, such as trains, may be controlled to provide predictable transportation of people between the various stops in a safe manner. However, these typical mass transit systems require people to travel through the mass transit system without their personal vehicles and according to the schedule dictated by the system. These track-based conventional mass transit systems are completely separate and distinct from environments in which personal and commercial vehicles are used, since automobiles such as cars, buses, and trucks are not configured to interface with and be controlled by the mass transit systems.

Moreover, as alluded to above, because typical mass transit vehicles are directed between designated stops via tracks, these vehicles are limited in their direction of travel and the destinations to which they can travel. As a result, users of conventional mass transit systems are limited to traveling between designated stops at designated times and with only what they can carry on and stow within a mass transit vehicle. In order for a mass transit vehicle to reach a new location, additional tracks and supporting infrastructure need to be installed, which require considerable capital expenditure and may have a negative environmental impact.

There is a need for a transportation system that provides for the convenience and safety advantages that accompany an autonomous centrally-controlled transportation system, with the flexibility and practicality of user-controlled and owned vehicles. It is with respect to these considerations and others that the disclosure made herein is presented.

SUMMARY

Technologies are described herein for providing a trackless transit system and controlling adaptive trackless vehicles within that system. Through the utilization of the technologies and concepts presented herein, movement of one or more trackless vehicles within the transit system is controlled remotely by a control system. By utilizing trackless vehicles, the control system may control the movement of vehicles within the transit system without being guided by tracks or similar guiding mechanisms. The vehicles may be selectively switched between operating in a system controlled mode and a driver controlled mode.

According to one aspect of the disclosure, an autonomous vehicle transit system for controlling vehicle movement of trackless vehicles in the transit system includes a command, control and orchestration system (CCOS) and vehicle controllers. Each vehicle controller is associated with a trackless vehicle and communicates vehicle position information to the CCOS, receives a navigation command, and controls the trackless vehicle according to the navigation command. Further, the CCOS provides navigation commands to the vehicle controllers to control movements of the trackless vehicles within the transit system according to vehicle position information received from the vehicle controllers.

In another aspect of the present disclosure, a method for controlling movement of trackless vehicles within an autonomous vehicle transit system includes sending a destination address for a trackless vehicle to a CCOS. A navigation command corresponding to navigating the trackless vehicle along a vehicle route from a current location to the destination address is received from the CCOS. The navigation command is then executed such that the trackless vehicle is navigated along the vehicle route from the current location to the destination address.

In yet another aspect, a vehicle autonomy kit for navigating a vehicle in a transit system includes a position sensor for tracking a current location of a vehicle. The autonomy kit also includes a vehicle perception sensor configured to perceive and communicate vehicle surroundings to a vehicle controller. The vehicle controller is configured to send vehicle surroundings perceived by the vehicle perception sensor to a CCOS and receive navigation commands for navigating the vehicle in an unguided manner within the controlled area from the CCOS. A drive-by-wire module in communication with the vehicle controller is configured to control speed and direction of the vehicle according to the navigation commands received by the vehicle controller.

It should be appreciated that the above-described subject matter may also be implemented in various other embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Technologies are described herein for providing a trackless transit system and controlling adaptive trackless vehicles within that system. Through the utilization of the technologies and concepts presented herein, one or more trackless vehicles may be controlled remotely within a controlled area by a command, control, and orchestration system (CCOS) of the trackless transit system. By utilizing trackless vehicles, the vehicles may travel to various locations within the controlled area without being guided by tracks or similar guiding mechanisms. The vehicles may be adaptive such that the vehicle may be selectively switched between operating in a system controlled mode within the controlled area and a driver controlled mode outside of the controlled area.

According to embodiments, an adaptive trackless vehicle may include a vehicle autonomy kit that is configured to allow the CCOS to control the vehicle. The vehicle autonomy kit includes a vehicle controller, a position sensor, and a drive-by-wire module that operates drive components associated with the vehicle. The vehicle controller may be configured to receive position information from the position sensor and send the position information to the CCOS. The CCOS may then determine the current location of the vehicle and a destination address to where the vehicle is to be routed. Based on the current location and the destination address, the CCOS determines a vehicle route on which the vehicle should travel to arrive at a destination address. The CCOS may then send navigation commands to the vehicle controller, which then communicates these navigation commands to the drive-by-wire module. The drive-by-wire module of the vehicle may then operate the drive components, such as the steering, brake, acceleration, and gear components, via actuators, to navigate the vehicle to the destination address, according to the vehicle route determined by the CCOS.

The vehicle autonomy kit may be configured to be installed within a conventional automobile, such as a car, bus, or truck. In this way, a conventional automobile may be modified to include a vehicle autonomy kit, such that the automobile is capable of being autonomously controlled by the CCOS within the controlled area. As a result, an adaptive trackless transit system that includes autonomous trackless vehicles and adaptive vehicles configured to be autonomously controlled by the CCOS may operate in harmony within the controlled area.

In the following detailed description, references are made to the accompanying drawings that form a part hereof, and which are shown by way of illustration, specific embodiments, or examples. Referring now to the drawings, in which like numerals represent like elements through the several figures, a trackless transit system with adaptive vehicles according to the various embodiments will be described.

Figure 1:
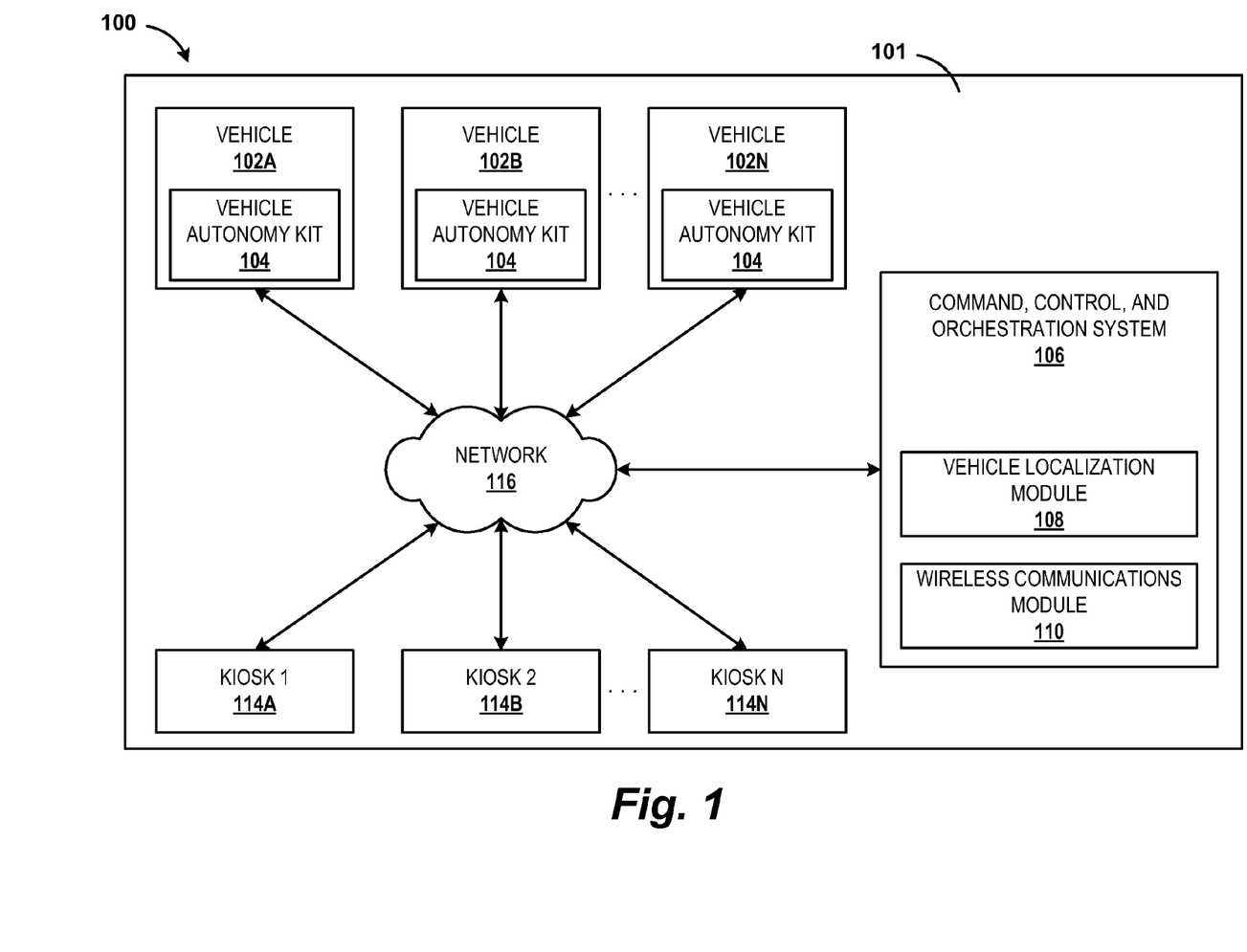
FIG. 1 is a system architecture diagram illustrating an autonomous trackless transit system and adaptive vehicles, in accordance with some embodiments.

FIG. 1 is a system architecture diagram illustrating an autonomous trackless transit system and adaptive vehicles. The transit system 100 includes a number of vehicles 102A-102N within a controlled area 101. The vehicles 102A-102N may hereinafter generally be referred to as vehicle 102 or vehicles 102. The controlled area 101 may be any space in which vehicles 102 are capable of being controlled by a command, control, and orchestration system (CCOS) 106. A detailed discussion of the controlled area 101 will be provided below following a discussion of the vehicles 102 and the CCOS 106. The system architecture 100 may also include one or more kiosks 114 through which passengers or users may communicate with the CCOS 106.

The vehicles 102 may include any vehicle capable of being controlled by the CCOS 106 within the controlled area 101. According to one embodiment, the vehicles 102 include trackless vehicles capable of navigating within the controlled area 101 in an unguided manner, such that the vehicles can navigate within the controlled area without the use of tracks or other guiding mechanisms, such as magnets, lasers, guideways, and the like. In one embodiment, the vehicles 102 are configured to be controlled by the CCOS 106 such that the vehicles 102 can travel in any direction without being limited to a particular direction of travel due to the inherent limitations of a guiding mechanism.

According to one embodiment, the vehicle 102A is a vehicle that is configured to be guided by tracks, the vehicle 102B is a trackless vehicle that is only operational upon being controlled by the CCOS 106, and the vehicle 102N is a manned vehicle, such as an automobile, that is capable of operating in a system controlled mode, in which the vehicle is autonomously controlled by the CCOS 106 while operating within the controlled area 101, or capable of operating in a driver controlled mode, in which the vehicle is controlled by a driver. Each of the vehicles 102 may be equipped with a vehicle autonomy kit 104, which when implemented on the vehicle 102, allows the CCOS 106 to control the vehicle 102. It should be appreciated that the vehicles 102A-102N may all be operating within the controlled area 101 at the same time, such that the CCOS 106 may be controlling each of the vehicles 102A-102N simultaneously. Although, for purposes of this disclosure, the CCOS 106 is configured to coordinate and control vehicles 102, the CCOS 106 may be configured to coordinate and control objects that are capable of travelling from one location to another location within the controlled area 101.

The CCOS 106 may be a system for coordinating and controlling a plurality of vehicles 102 within the controlled area 101 of the transit system 100. The CCOS 106 may be implemented as hardware, software, or a combination of hardware and software. The CCOS 106 may include one or more programs, applications, or modules for performing the various functions related to coordinating and controlling vehicles within the controlled area 101. As detailed throughout this description, the CCOS 106 may coordinate, control and route vehicles from one location to another within the controlled area 101. According to embodiments, the CCOS 106 may include a vehicle localization module 108 and a wireless communications module 110.

The vehicle localization module 108 may be configured to determine the current location of each of the vehicles 102 within the controlled area 101. According to one embodiment, the vehicle localization module 108 determines the current location of a vehicle using global positioning system (GPS) technology. In various embodiments, the vehicle localization module 108 may receive vehicle position information from each of the vehicles 102. According to one such embodiment, the vehicle may utilize optical position sensors to observe optical position markers on the floor of the controlled area 101, or in some instances, may utilize optical position sensors to observe optical position markers on the ceiling of a covered controlled area 101. The optical position markers may be sensed by a position sensor (shown in FIG. 2) that is part of the vehicle autonomy kit 104 installed on the vehicles 102. In further embodiments, vehicle positions may be determined using integrated, GPS, odometry and inertial sensors. In one embodiment, a hybrid optical/inertial sensor arrangement may be utilized to determine the current position of vehicles 102 within a controlled area 101. It should be appreciated that any quantity and type of known technologies may be used to determine the location of the vehicles 102. It should be appreciated that the vehicle localization module 108 may be a part of any other module, program, or application being executed by the CCOS 106.

The vehicle localization module 108 may then communicate the current positions of the vehicles 102 to the CCOS 106, which utilizes the current position of the vehicles 102 to determine vehicle routes for navigating the vehicles 102 from their current location to their desired destination. The CCOS 106 may determine the desired destination of vehicles through manual requests received from passengers or users communicating with the CCOS 106, or through computer-generated requests based on a pre-defined schedule.

According to various embodiments, the CCOS 106 is configured to manage requests and control one or more vehicles 102 operating within the controlled area 101. In order to control the vehicles 102, the CCOS 106 may be configured to generate and send navigation commands to each of the vehicles 102. Navigation commands may include instructions capable of being executed by the vehicle 102, which cause the vehicle 102 to travel along the vehicle route at a specific speed and direction. In addition, because the CCOS 106 may be configured to control multiple vehicles, the CCOS 106 is capable of determining vehicle routes in such a way so as to avoid traffic congestion, collisions between vehicles, and any other traffic related issues. As a result, by way of the present disclosure, the CCOS is capable of facilitating the flow of traffic within the controlled area 101, while reducing the risk of collisions.

As briefly mentioned above, the CCOS 106 is configured to receive and execute requests for routing vehicles within the controlled area 101. The requests may include a request for picking up a passenger at a first location and taking the passenger to a second location. Other requests may include routing a delivery truck from a third location to a fourth location. In addition, other requests may include a bus being routed from a bus stop A to a bus stop B to a bus stop C to a bus stop D according to a pre-defined schedule. According to embodiments, the request may be received from an operator or passenger in communication with the CCOS 106, or may be computer-generated based on a pre-defined schedule.

Upon receiving a request to route a vehicle 102 within the controlled area 101, the CCOS 106 causes the vehicle 102 to be routed according to the request. Using the request for picking up a passenger at a first location and taking the passenger to a second location as an example, the CCOS 106 determines vehicles that are capable of fulfilling the request and that are proximate to the first location. Upon determining the list of vehicles that are capable of fulfilling the request and that are proximate to the first location, the CCOS 106 is configured to select the closest available vehicle to fulfill the request and route the selected vehicle to the first location. Upon the vehicle's arrival at the first location, the CCOS 106 may be configured to open a door of the vehicle 102 to allow the passenger to embark the vehicle. The CCOS 106 then determines a vehicle route from the first location to the second location, and causes the vehicle 102 to travel to the second location along the vehicle route by sending navigation commands to the vehicle 102.

According to embodiments, the CCOS 106 may further be configured to perform various other functions related to controlling vehicles within a controlled area 101, such as opening and closing doors associated with the vehicles, adjusting environmental conditions, such as the lighting and temperature within the vehicle, and communicating with a passenger, via a user input device of the vehicle. It should be appreciated that the functions of the CCOS 106 may be performed by any other module, program, or application operating within the CCOS 106.

According to embodiments, the CCOS 106 may also include a wireless communications module 110. The wireless communications module 110 may be configured to manage, establish, and end communications between each of the vehicles 102 and the CCOS 106. In addition, the wireless communication module 110 may also manage, establish, and end communications with one or more kiosks 114 through which passengers may request vehicles, make payments, schedule trips, among other functions. It should be appreciated that the wireless communications module 110 may be a part of any other module, program, or application being executed by the CCOS 106.

The system architecture 100 may also include one or more kiosks 114A-114N. The kiosks 114A-114N may hereinafter generally be referred to as kiosk 114 or kiosks 114. According to one embodiment, vehicle kiosks 114 may be located within the vehicles 102 such that passengers within the vehicle can modify their destination address, make payments for using the vehicle, and schedule future trips. Freestanding kiosks 114 may be located at various locations within the controlled area 101. It should be appreciated that the kiosks 114 located within the vehicles may have the same, additional, or limited functionality compared to free-standing kiosks 114 that are located around various locations within the controlled area 101.

According to embodiments, the kiosks 114 may be configured to provide a user interface for users to request a vehicle 102 for transporting passengers from one location to another location within the controlled area 101. In addition, users may send requests to the CCOS 106 to route the vehicles 102 to a specific location. The kiosks 114 may provide other functionality, such as display wait times, costs for transportation, and further be configured to receive payments from a user. In addition, the kiosks 114 may be configured to provide an interface to a user for calling an emergency vehicle, such as an ambulance or a fire engine. The kiosks 114 may also be configured to make reservations for future travel plans.

It should be appreciated that the kiosks 114 may be touch screen devices or any other type of user input devices. According to one embodiment, the kiosks 114 may be implemented as software applications on mobile devices, such as mobile phones, laptops, or other communication devices.

As briefly mentioned above, the controlled area 101 described herein may be any space in which vehicles 102 are capable of being controlled by the CCOS 106. In various embodiments, the controlled area 101 may restrict access to only autonomous vehicles 102 that are capable of being controlled by the CCOS 106. However, in one embodiment, the controlled area 101 may include an ingress and an egress such that vehicles that are capable of being operated outside the confines of the controlled area 101 may enter and exit the controlled area 101, via the ingress and egress, respectively.

For instance, conventional automobiles that have the capability of being controlled by the CCOS 106 may enter the controlled area 101 through the ingress. However, prior to entering the controlled area 101 via the ingress, the vehicle may be switched from being operated in a driver controlled mode in which a driver is capable of manually operating the vehicle to a system controlled mode in which the vehicle is autonomously controlled by the CCOS 106. Once the vehicle is switched to operate in the system controlled mode, the CCOS 106 may be configured to establish communications with the vehicle by which the CCOS 106 may control the vehicle. According to one embodiment, upon switching the vehicle to operate in the system controlled mode, the vehicle autonomy kit 104 mechanically connects to one or more actuators that control drive components of the vehicle such that the vehicle autonomy kit 104 may send instructions to the one or more actuators for controlling the movement of the vehicle 102.

Similarly, when a vehicle is ready to exit the controlled area 101, the CCOS 106 routes the vehicle to the egress. At the egress, a driver of the vehicle may switch the vehicle to operate in the driver controlled mode such that the CCOS 106 no longer has control over the vehicle. Once the vehicle is in the driver controlled mode, the driver may manually operate the vehicle again. According to one embodiment, upon switching the vehicle to operate in the driver controlled mode, the vehicle autonomy kit 104 is mechanically disconnected from one or more actuators that control drive components of the vehicle such that the vehicle autonomy kit 104 may no longer send instructions to the one or more actuators for controlling the movement of the vehicle 102. As a result, the vehicle can no longer be controlled by the CCOS 106.

In one embodiment, vehicles operating in the driver controlled mode may also be allowed to enter the controlled area 101. For instance, emergency vehicles, such as ambulances and fire engines, may be configured to manually operate within the controlled area 101. However, in such embodiments, the CCOS may be able to determine the current location of the emergency vehicle and the direction of travel, and route traffic of other autonomous vehicles 102 operating in the controlled area 101 away from the route of the emergency vehicle.

Figure 2:
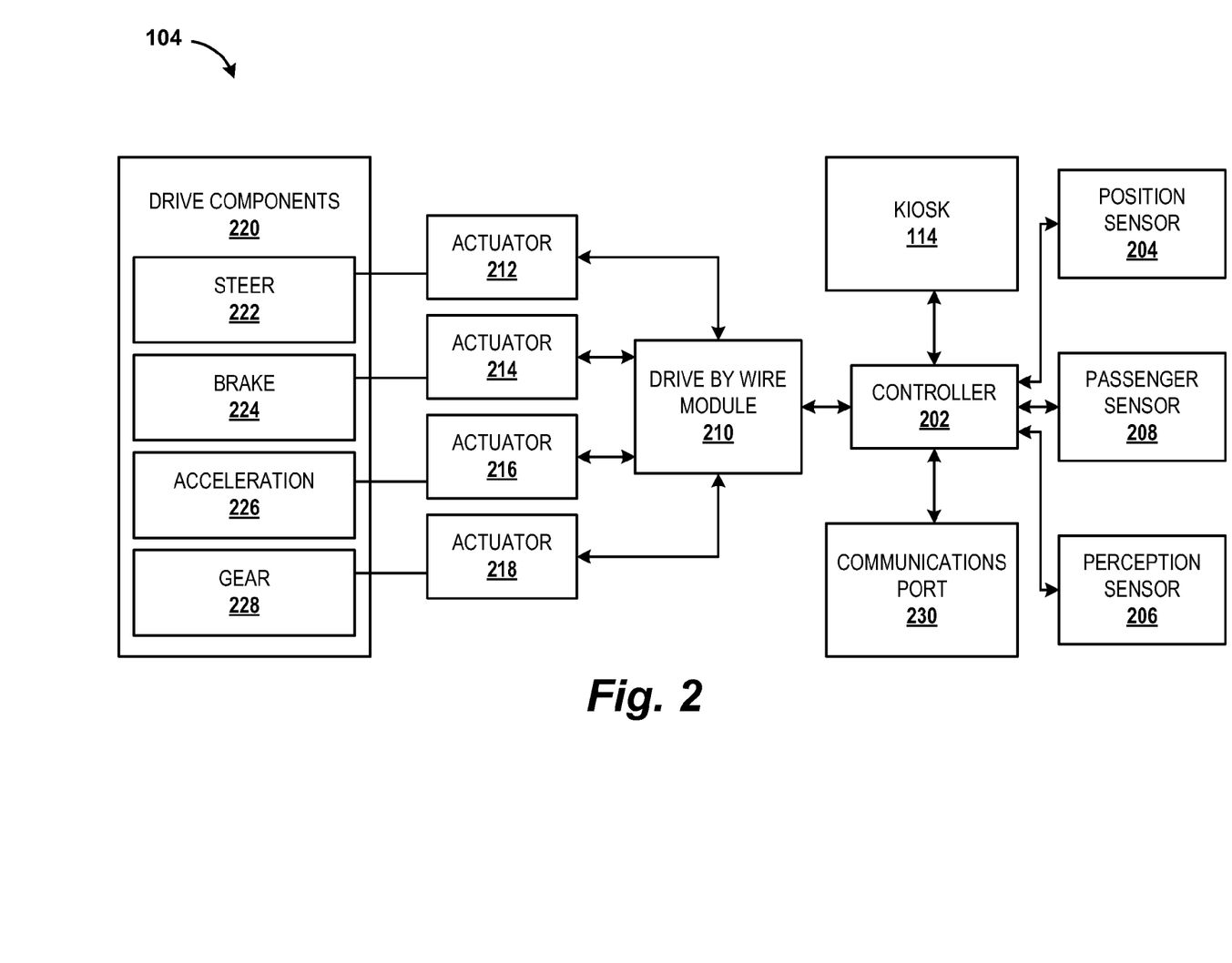
FIG. 2 is an architecture diagram illustrating a vehicle autonomy kit associated with a vehicle operating in the transit system, in accordance with some embodiments.

Referring now to FIG. 2, an architecture diagram illustrating a vehicle autonomy kit 104 associated with a vehicle is shown. The vehicle autonomy kit 104 includes a vehicle controller 202 that is configured to communicate with one or more components of the vehicle autonomy kit 104 as well as the CCOS 106.

According to various embodiments, the vehicle controller 202 may be configured to communicate with the kiosk 114, which provides functionality similar to the kiosks 114 described above with respect to FIG. 1. The vehicle controller 202 may be configured to present a user interface on the kiosk 114, which is an input device, such as a touch screen device. The kiosk 114 allows the passenger to enter a destination address, receive payment information, as well as make reservations for future travel. The kiosk 114 passes the input received from the passenger to the vehicle controller 202, which in turn passes the received input to the CCOS 106. In addition, the vehicle controller 202 may receive responses from the CCOS 106 pertaining to the input received at the kiosk 114, and present the responses to the passenger via the kiosk 114. As described herein, the kiosk 114 may facilitate communications between the passenger and the CCOS 106.

The vehicle controller 202 is also in communication with a position sensor 204 located on the vehicle that is configured to determine the current location of the vehicle 102. The position sensor 204 may be a GPS receiver that determines the current location of the vehicle 102 or a GPS transponder that allows the CCOS 106 to determine the GPS coordinates of the vehicle 102. Alternatively, the position sensor 204 may be any other location based component that causes the CCOS 106 to determine the location of the vehicle 102 within the controlled area 101. In addition, the position sensor 204 may also be configured to determine the direction in which the vehicle 102 is facing. In one embodiment, the transit system 110 has a grid of location markers that the position sensor 204 may utilize to determine the current location of the vehicle. In a covered controlled area, the position sensor may be an optical position sensor configured to observe optical position markers on a ceiling of the controlled area to determine a current location of the vehicle 102 within the controlled area.

In addition, the vehicle controller 202 is also in communication with a perception sensor 206 located on the vehicle 102. The perception sensor 206 may be configured to detect objects surrounding the vehicle 102 that may not be detectable by the CCOS 106. In this way, if the vehicle 102 is being routed from a first location to a second location, the perception sensor 206 may be able to notify the vehicle controller 202 that an obstruction is in the way of the vehicle. As a result, the vehicle controller 202 or the CCOS 106 may be configured to cause the vehicle 102 to navigate around the obstruction. In various embodiments, the perception sensor 206 may also be able to detect other vehicles, and therefore, may be utilized to prevent collisions with other vehicles. It should be appreciated that the perception sensor 206 may be an automotive grade light detecting and radar (LIDAR) capable of sensing obstructions 360 degrees around the vehicle.

The vehicle controller 202 may further be configured to communicate with a passenger sensor 208 located within the vehicle 102. The passenger sensor 208 may be configured to determine whether a passenger is inside the vehicle 102. Upon determining whether a passenger is inside the vehicle 102, the passenger sensor 208 may send this information to the vehicle controller 202. The vehicle controller 202, in response to receiving this information, may present the user interface to the passenger, via the kiosk 114.

According to embodiments, the vehicle controller 202 is also configured to receive navigation commands from the CCOS 106 for navigating the vehicle along a vehicle route determined by the CCOS 106. Upon receiving the navigation commands from the CCOS 106, the vehicle controller 202 may generate instructions corresponding to the navigation commands, and send the instructions to a drive-by-wire module 210 to control the movement of the vehicle. It should be appreciated that in various embodiments, the drive-by-wire module 210 may be a part of the vehicle controller 202.

The drive-by-wire module 210 may be configured to control various components that are utilized to control the speed and direction of the vehicle 102 according to the navigation commands received by the vehicle controller 202 from the CCOS 106. According to embodiments, the drive-by-wire module 210 may be configured to control drive components 220, such as a steering component 222 via a steering actuator 212, a brake component 224 via a brake actuator 214, an acceleration component 226 via an acceleration actuator 216, and a gear component 228 via a gear actuator 218. The steering component 222 and the gear component 228 may be utilized to control the direction in which the vehicle 102 is travelling, while the brake component 224 and the acceleration component 226 may be utilized to control the speed at which the vehicle 102 is travelling. It should be appreciated that the drive components 220 may be a part of a conventional vehicle, such as an automobile or a part of the vehicle autonomy kit 104 to interface with applicable vehicle components already existing on the vehicle In various embodiments, the navigation commands received by the vehicle controller 202 from the CCOS 106 may include one or more instructions that are to be executed by the drive-by-wire module 210. The navigation commands may include a steering instruction for controlling the steering actuator 212, which controls direction of the vehicle 102. The navigation commands may also include an acceleration instruction for controlling the acceleration actuator 216, which controls the acceleration of the vehicle 102. The navigation commands may also include a brake instruction for controlling the brake actuator 214, which controls the brake component 224 of the vehicle, and a gear instruction for selecting a drive gear or a reverse gear of the gear component 228 using the gear actuator 218.

Communications between the vehicle controller 202 and the CCOS 106 or the network 116, in general, are facilitated by the communications port 230. The communications port 230 may be any interface that facilitates communication between the vehicle controller 202 and the network 116.

According to embodiments, the communications port 230 may be a radio antenna, a wireless network card, or any other device that is capable of facilitating communications between the vehicle controller 202 and the network 116.

Figure 3:
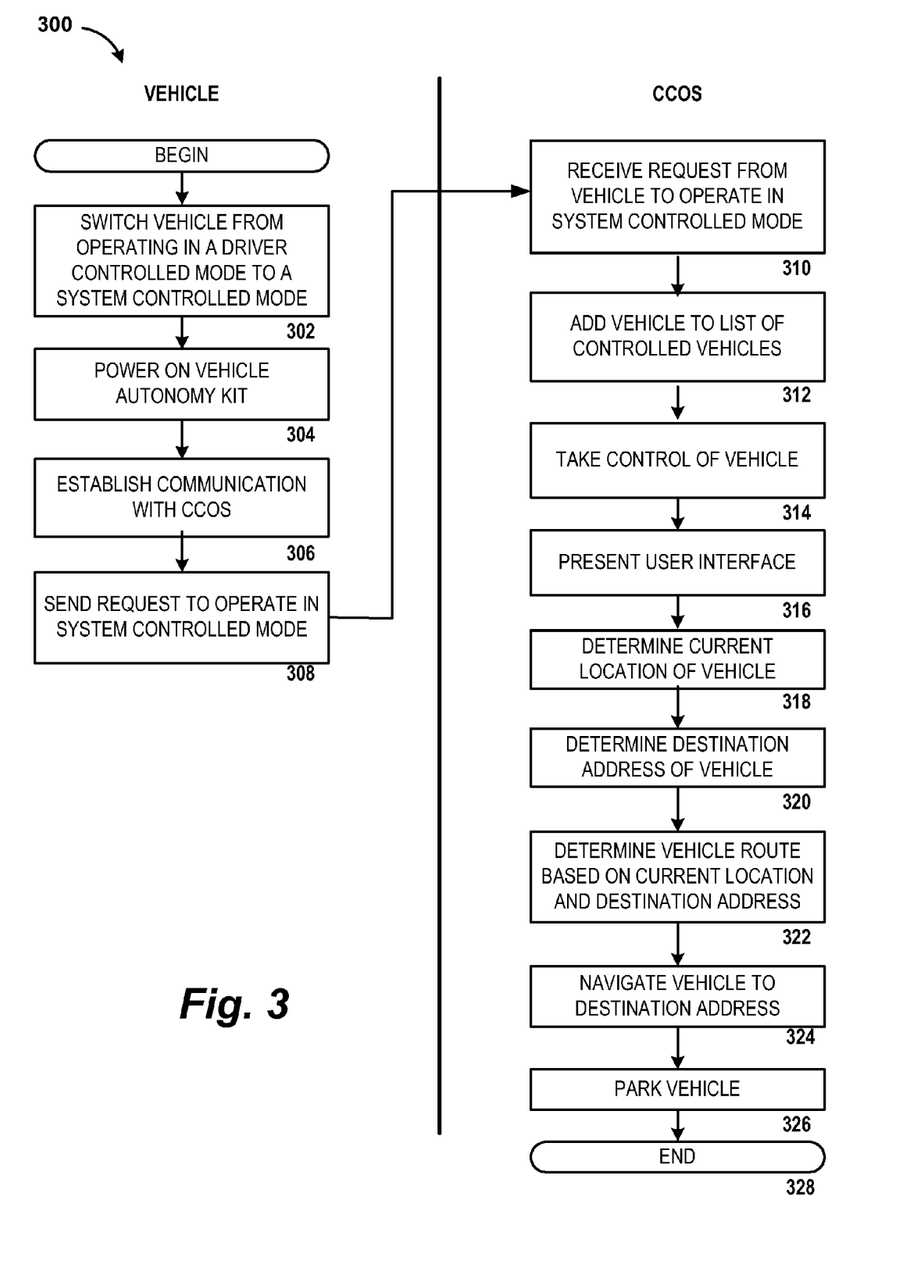
FIG. 3 is a flow diagram illustrating aspects of one process disclosed herein for controlling vehicles in the transit system, in accordance with some embodiments.
Figure 4:
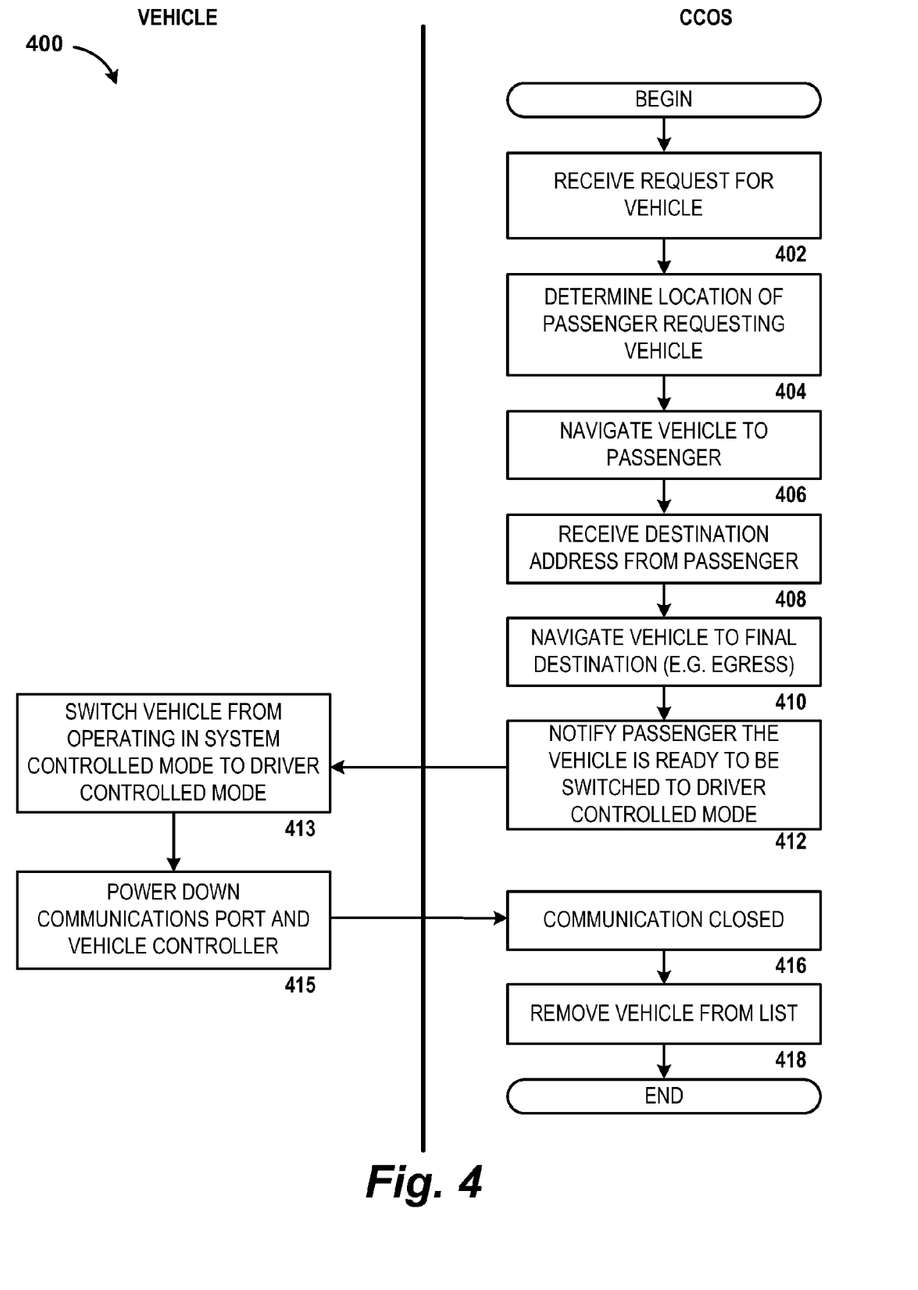
FIG. 4 is a flow diagram illustrating aspects of one process disclosed herein for controlling vehicles in the transit system, in accordance with some embodiments.
Figure 5:
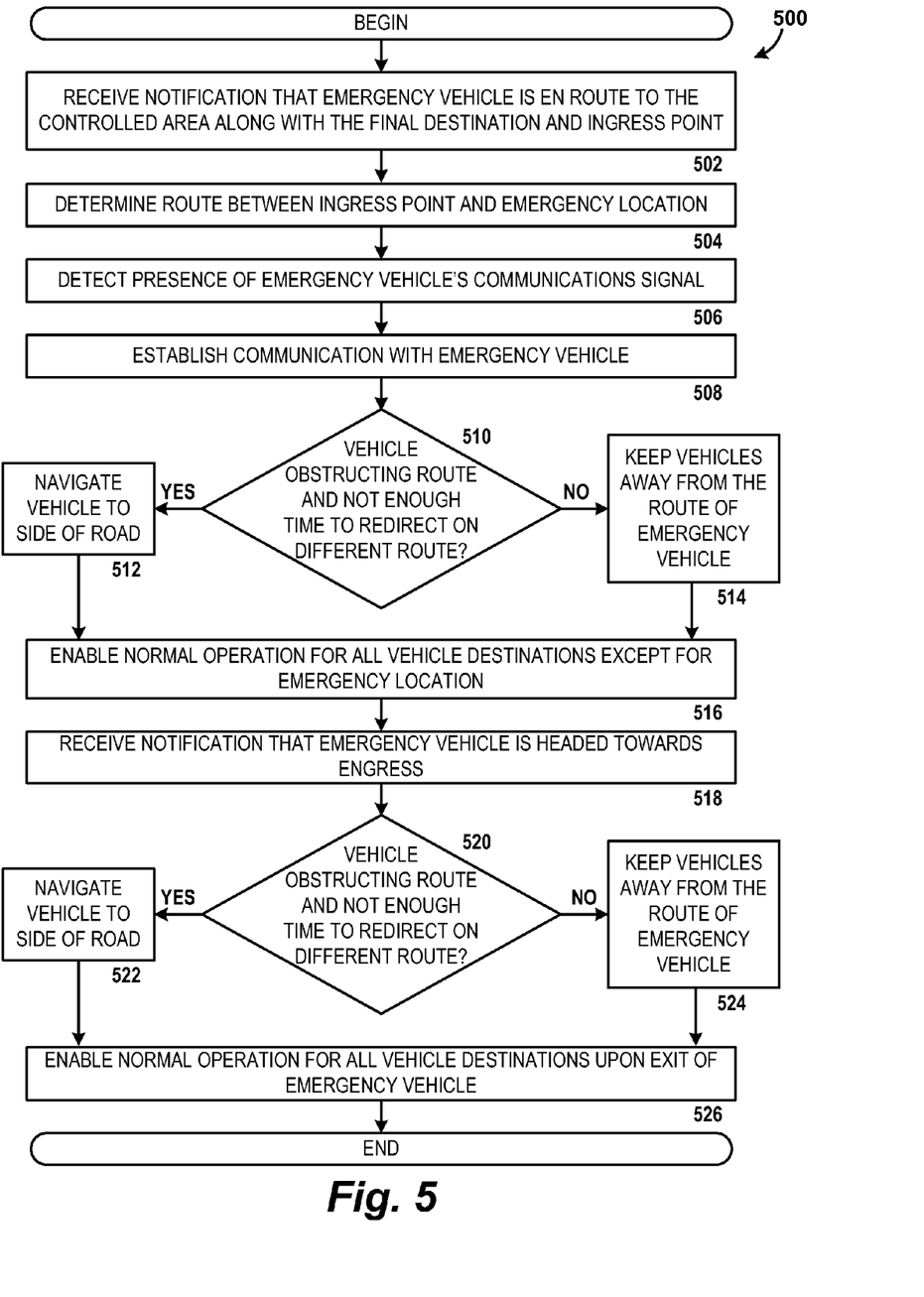
FIG. 5 is a flow diagram illustrating aspects of one process disclosed herein for controlling emergency vehicles in the transit system, in accordance with some embodiments.

Referring now to FIGS. 3-5, additional details regarding the operation of vehicles 102 and the CCOS 106 will be described. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

FIG. 3 is a flow diagram illustrating aspects of one process disclosed herein for controlling vehicles in the transit system, in accordance with some embodiments. In particular, FIG. 3 shows a routine 300 for controlling a manned vehicle within the controlled area 101. The routine 300 begins at operation 302, where a manned vehicle, such as an automobile is switched from operating in a driver controlled mode to a system controlled mode.

As described above, when the vehicle 102 is operating under the control of a driver, the vehicle 102 is said to be operating in a driver controlled mode. When the vehicle 102 is operating under the control of the CCOS 106, the vehicle 102 is operating in a system controlled mode. According to embodiments, the vehicle 102 may need to be switched to a system controlled mode to allow the CCOS 106 to take control of the vehicle. In one embodiment, the vehicle 102 may need to be located within ingress of the controlled area 101 for the CCOS 106 to take control of the vehicle 102. The ingress may be an area at a boundary of the controlled area 101 into which the vehicle 102 may be driven by a driver for entry into the controlled area 101.

According to embodiments, a driver of the manned vehicle 102 may flip a switch within the vehicle 102 to switch the vehicle 102 from operating in a driver controlled mode to operating in a system controlled mode. In alternate embodiments, once a vehicle 102 enters the ingress, the CCOS 106 may automatically switch the vehicle 102 from operating in a driver controlled mode to a system controlled mode upon detecting the presence of the vehicle 102 within the ingress of the controlled area 101. In such embodiments, the vehicle 102 autonomy kit of the vehicle 102 may already be powered on such that the CCOS 106 is able to detect the vehicle 102 entering the ingress of the controlled area 101.

From operation 302, the routine 300 proceeds to operation 304, where the vehicle autonomy kit 104 is activated upon switching the vehicle from operating in a driver controlled mode to the system controlled mode. According to embodiments, the vehicle autonomy kit 104 may include the vehicle controller 202, communications port 230, position sensor 204, perception sensor 206, passenger sensor 208, and the kiosk 114. According to embodiments, when the vehicle autonomy kit is activated, the vehicle autonomy kit may be mechanically connected to one or more actuators controlling the trackless vehicle 102 and may be configured to receive one or more navigation commands from the CCOS. The vehicle controller 202 may then execute the one or more navigation commands by sending instructions to the one or more actuators controlling the trackless vehicle. According to embodiments, when the vehicle switches from operating in the system controlled mode to the driver controlled mode, the vehicle autonomy kit 104 is mechanically disconnected from the one or more actuators of the trackless vehicle 102.

From operation 304, the routine 300 proceeds to operation 306, where the vehicle 102 establishes a connection with the CCOS 106. According to embodiments, the vehicle's communications port 230 may be configured to connect to the network on which the CCOS 106 is connected upon being powered on. Once the vehicle's communications port 230 establishes a connection with the network 116, the vehicle 102 may be configured to send messages to the CCOS 106 and vice versa.

From operation 306, the routine 300 proceeds to operation 308, where the vehicle 102 sends a request to the CCOS 106 to operate in a system controlled mode. In one embodiment, upon being powered on, the vehicle controller 202 may send the request to operate in a system controlled mode to the CCOS 106 via the communications port 230. The request to operate in a system controlled mode may include a request to be controlled by the CCOS 106. In addition, the request to operate in a system controlled mode may include identifying information, such as a unique vehicle identifier associated with the vehicle 102, such that the CCOS 106 is able to identify the vehicle 102 that is requesting to be operated in a system controlled mode.

From operation 308, the routine 300 proceeds to operation 310, where the CCOS 106 receives the request from the vehicle 102 to operate in a system controlled mode. From operation 310, the routine 300 proceeds to operation 312, where the CCOS 106 adds the vehicle 102 to a list of controlled vehicles. The list may be stored within the CCOS 106 or on any computer-readable storage medium located on the network that is accessible by the CCOS 106.

The list may include a listing of all vehicles that are currently being controlled by the CCOS 106 within the controlled area 101. In addition, the list may also include a listing of all vehicles that have previously been controlled by the CCOS 106. The list may also include information associated with the vehicles contained in the list, such as their current operating status, their current location, the type of vehicle, historical route information, and the like. The current operating status may indicate whether the vehicle is currently being operated, if it is parked, or if it is no longer within the controlled area 101. The type of vehicle may include vehicles that are only operational within the controlled area 101, automobiles, such as cars, trucks and buses, and emergency vehicles. The historical route information may include all the routes that the vehicle 102 has traveled within the controlled area 101. The historical route information may also include pickup and drop-off locations, ingresses through which the vehicle 102 entered the controlled area 101 and egresses through which the vehicle 102 has exited the controlled area 101, and other route related information.

From operation 312, the routine 300 proceeds to operation 314, where the CCOS 106 takes control of the vehicle 102. When the CCOS 106 takes control of the vehicle 102, the CCOS 106 is capable of controlling the vehicle 102 by sending navigation commands to the vehicle controller 202 of the vehicle 102. The vehicle controller 202 then sends instructions to the drive-by-wire module of the vehicle 102, which then executes the instructions via actuators associated with the drive components 220 of the vehicle 102.

From operation 314, the routine 300 proceeds to operation 316, where the CCOS 106 presents a user interface to a passenger within the vehicle 102 via the kiosk within the vehicle 102. The user interface may allow the passenger to communicate with the CCOS 106. According to embodiments, the passenger may then enter a destination address on the user interface to which the passenger would like the vehicle 102 to be routed. In other embodiments, the CCOS 106 may be configured to route the vehicle 102 to a particular location based upon a pre-defined schedule that is maintained by the CCOS 106. The schedule may include future travel plans associated with the passenger of the vehicle 102.

From operation 316, the routine 300 proceeds to operation 318, where the CCOS 106 determines the current location of the vehicle 102. The CCOS 106 may determine the current location of the vehicle 102 by receiving information from the position sensor 204 of the vehicle 102. The CCOS 106 may also be configured to determine the direction in which the vehicle 102 is facing via the position sensor of the vehicle 102.

From operation 318, the routine 300 proceeds to operation 320, where the CCOS 106 determines the destination address of the vehicle 102. As described above, the CCOS 106 may determine the destination address of the vehicle 102 based on a pre-defined schedule associated with the passenger of the vehicle 102. In one embodiment, the vehicle 102 may receive a destination address from the passenger via the user interface presented on the kiosk 114 of the vehicle 102.

Upon determining the destination address of the vehicle 102, the routine 300 proceeds from operation 320 to operation 322, where the CCOS 106 determines the vehicle route on which to navigate the vehicle 102 from the current location to the destination address. According to embodiments, the CCOS 106 may determine the vehicle route based on the shortest route, the shortest time of travel, or any other deterministic model for route planning. In addition, the vehicle route may be influenced by the vehicle routes of other vehicles being controlled by the CCOS 106. In this way, the CCOS 106 can select a vehicle route that will be the least disruptive to the routes of other vehicles. This will result in less traffic congestion and fewer or no collisions. It should be appreciated that because the CCOS 106 is able to control multiple vehicles within the controlled area 101, the CCOS 106 may dynamically alter the vehicle routes of one or more vehicles in an attempt to eliminate or reduce traffic related issues.

From operation 322, the routine 300 proceeds to operation 324, where the CCOS 106 navigates the vehicle 102 to the destination address according to the determined vehicle route. According to embodiments, the CCOS 106 may send navigation commands to the vehicle controller 202 of the vehicle 102. As described above, navigation commands may include instructions capable of being executed by the vehicle 102, which cause the vehicle 102 to travel along the vehicle route at a specific speed and direction. According to various embodiments, the vehicle 102 may receive the navigation commands at the vehicle controller 202, which then sends instructions corresponding to the navigation commands to the drive-by-wire module of the vehicle 102, which then utilizes actuators to control the speed and direction of the vehicle 102.

From operation 324, the routine 300 proceeds to operation 326, where upon the CCOS 106 arriving at the destination address, the CCOS 106 parks the vehicle 102 at a designated parking location within the controlled area 101. The designated parking location may be curb-side, or may be at a parking location closest to the controlled area 101. According to embodiments, the CCOS 106 is able to determine which parking location is empty since the CCOS 106 has access to a list of all the parking locations within the controlled area 101. Since the CCOS 106 knows the location of all the vehicles within the controlled area 101, the CCOS 106 may be able to determine which parking locations are available based on the location of each of the vehicles 102 within the controlled area 101. Upon determining an empty parking location, the CCOS 106 may route the vehicle 102 to the empty parking location. From operation 326, the routine 300 ends at operation 328.

FIG. 4 is a flow diagram illustrating aspects of one process disclosed herein for controlling vehicles in the transit system. In particular, FIG. 4 shows a routine 400 for navigating the vehicle parked at the empty parking location to an egress of the controlled area 101. The routine 400 begins at operation 402, where the CCOS 106 receives a request for the vehicle 102. The request may be generated by a user at any kiosk 114 within the controlled area 101. In one embodiment, the request may include an origination address at which the user sending the request is located. In addition, the request may also include a destination address to which the user is to be dropped off upon being picked up at the origination address.

From operation 402, the routine 400 proceeds to operation 404, where the CCOS 106 determines the location of the user requesting the vehicle 102. According to embodiments, the request may include the location of the user, or the CCOS 106 may determine the location of the user based on the location of the kiosk from which the request was sent.

From operation 404, the routine 400 proceeds to operation 406, where the CCOS 106 navigates the vehicle 102 to the user at the requested location. As described above, the CCOS 106 may send navigation commands to the vehicle 102, which cause the vehicle controller 202 to navigate the vehicle 102 to the requested location. Once the vehicle 102 arrives at the requested location, the CCOS 106 may send a command to the vehicle controller 202 causing a door of the vehicle to open. The user may then enter the vehicle 102 at which point, the user becomes a passenger of the vehicle.

From operation 406, the routine 400 proceeds to operation 408, where the CCOS 106 receives a destination address from the passenger via the kiosk 114 in the vehicle 102. The destination address may be any location within the controlled area 101, including an egress of the controlled area 101. According to embodiments, the destination address may have been received with the request for the vehicle, as described in operation 402. However, in various embodiments, the passenger may modify his destination address at any point while within the vehicle 102 by communicating with the CCOS 106 via the kiosk 114 located within the vehicle 102.

From operation 408, the routine 400 proceeds to operation 410, where the CCOS 106 causes the vehicle 102 to navigate to the destination address. According to embodiments, the destination address may be an egress of the controlled area 101. In such embodiments, when the vehicle 102 arrives at the egress, the CCOS may receive a request to relinquish control of the vehicle 102. The request may be generated automatically upon the vehicle entering the egress, or may be a request made by the passenger via the kiosk 114 within the vehicle 102. In various embodiments, the passenger may request the CCOS 106 to relinquish control of the vehicle at any point. Upon receiving the request, the CCOS 106 may be configured to navigate the vehicle to an egress of the controlled area 101, and relinquish control of the vehicle upon entering the egress.

From operation 410, the routine 400 proceeds to operation 412, where the CCOS 106 notifies the passenger that the vehicle 102 may now be switched from the system controlled mode to the driver controlled mode. The CCOS 106 may notify the passenger upon the vehicle 102 entering the egress of the controlled area 101. According to embodiments, the CCOS 106 may notify the passenger by presenting the notification on the user interface of the kiosk 114.

From operation 412, the routine 400 proceeds to operation 413, where the passenger switches the vehicle 102 from the system controlled mode to the driver controlled mode. According to embodiments, the vehicle 102 may include a switch that may be flipped form the system controlled mode position to the driver controlled mode position. From operation 413, the routine 400 proceeds to operation 415, where the vehicle autonomy kit 104 is powered off. In one embodiment, the CCOS 106 may relinquish control of the vehicle 102 once the vehicle is switched from operating in a system controlled mode to operating in the driver controlled mode.

From operation 415, the routine 400 proceeds to operation 416, where the communication between the vehicle 102 and the CCOS 106 ends. According to embodiments, the communication between the vehicle 102 and the CCOS 106 ends once the communications port 230 and/or the vehicle controller 202 of the vehicle 102 is powered off.

From operation 416, the routine 400 proceeds to operation 418, where the CCOS 106 removes the vehicle 102 from the list of vehicles being controlled within the controlled area 101. According to embodiments, the CCOS 106 may only control vehicles that are registered on the list of vehicles being controlled within the controlled area 101. From operation 418, the routine 400 ends at operation 420.

FIG. 5 is a flow diagram illustrating aspects of one process disclosed herein for controlling emergency vehicles in the transit system, in accordance with some embodiments. In particular, FIG. 5 illustrates a routine 500 for controlling vehicles within the controlled area 101 of the transit system upon receiving notification that an emergency vehicle is entering the controlled area 101. The routine 500 begins at operation 502, where the CCOS 106 receives notification that an emergency vehicle is en route to the controlled area 101. The notification may further include information including the location of the emergency, the ingress at which the emergency vehicle will enter the controlled area 101, and the estimated time of arrival at the ingress. The notification may be received from an emergency command center or the emergency vehicle itself.

From operation 502, the routine 500 proceeds to operation 504, where the CCOS 106 determines the vehicle route of the emergency vehicle between the ingress and the emergency location. From operation 504, the routine 500 proceeds to operation 506, where the CCOS 106 detects the presence of the emergency vehicle. According to embodiments, the CCOS 106 may detect the presence of the emergency vehicle once the emergency vehicle enters the controlled area 101 by detecting that the emergency vehicle is connected to the network 116. From operation 506, the routine 500 proceeds to operation 508, where the CCOS 106 begins to track the location of the emergency vehicle within the controlled area 101.

From operation 508, the routine 500 proceeds to operation 510, where the CCOS 106 determines whether a vehicle 102 within the controlled area 101 is obstructing the route of the emergency vehicle and has insufficient time to be redirected on a different route. If the vehicle 102 is obstructing the route of the emergency vehicle and has insufficient time to be redirected on a different route, the routine 500 proceeds from operation 510 to operation 512, where the CCOS 106 causes the vehicle to navigate to the side of the road such that the emergency vehicle's movement is not impeded by the vehicle 102. If the vehicle 102 is not obstructing the route of the emergency vehicle or has sufficient time to be redirected on a different route, the routine 500 proceeds from operation 510 to operation 514, where the CCOS 106 causes the vehicle 102 to stay or travel away from the route of the emergency vehicle.

From operations 512 and 514, the routine 500 proceeds to operation 516, where the CCOS 106 proceeds with the normal operation of vehicles 102 within the controlled area 101 except for vehicles 102 destined towards the emergency location. According to various embodiments, Vehicles 102 destined towards the emergency location may be rerouted or stopped until the CCOS 106 determines an alternate location to which to reroute the vehicles 102. From operation 516, the routine 500 proceeds to operation 518, where the CCOS 106 receives notification that the emergency vehicle is headed towards an egress of the controlled area 101. According to embodiments, the CCOS 106 may receive the notification from the emergency vehicle or from the emergency command center.

From operation 518, the routine 500 proceeds to operation 520, where the CCOS 106 determines whether a vehicle 102 within the controlled area 101 is obstructing the route of the emergency vehicle and has insufficient time to be redirected on a different route. If the vehicle is obstructing the route of the emergency vehicle and has insufficient time to be redirected on a different route, the routine 500 proceeds from operation 520 to operation 522, where the CCOS 106 causes the vehicle 102 to navigate to the side of the road such that the emergency vehicle's movement is not impeded by the vehicle 102. If the vehicle 102 is not obstructing the route of the emergency vehicle or has sufficient time to be redirected on a different route, the routine 500 proceeds from operation 520 to operation 524, where the CCOS 106 causes the vehicle 102 to stay or travel away from the route of the emergency vehicle.

Once the emergency vehicle has exited the controlled area 101, the routine 500 proceeds from operations 522 and 524 to operation 526, where the CCOS 106 proceeds with the normal operation of vehicles 102 within the controlled area 101 except for vehicles destined towards the egress or the route of the emergency vehicle.

It should be appreciated that the trackless transit system may be configured to adapt to changes in traffic density due to a larger volume of vehicles navigating within the controlled area or due to the closure of certain lanes or areas. For instance, as described above, vehicles may be rerouted away from a lane on which an emergency vehicle is travelling. Similarly, during times when a larger volume of vehicles are navigating within the controlled area, the CCOS may be configured to adapt to the spike in traffic by rerouting vehicles from lanes that are congested. It should also be contemplated by those skilled in the art that because the CCOS knows the route of each of the trackless vehicles, the CCOS may dynamically adjust the routes of other trackless vehicles based on the rerouting of a trackless vehicle.

In one instance, a lane may be closed due to a disabled vehicle. In such situations, the CCOS may receive information that a lane is closed and may thereby reroute vehicles that were originally intended to travel in that lane to an alternate route, thereby facilitating the flow of traffic and avoiding any possible congestion due to the closure of the lane.

Figure 6:
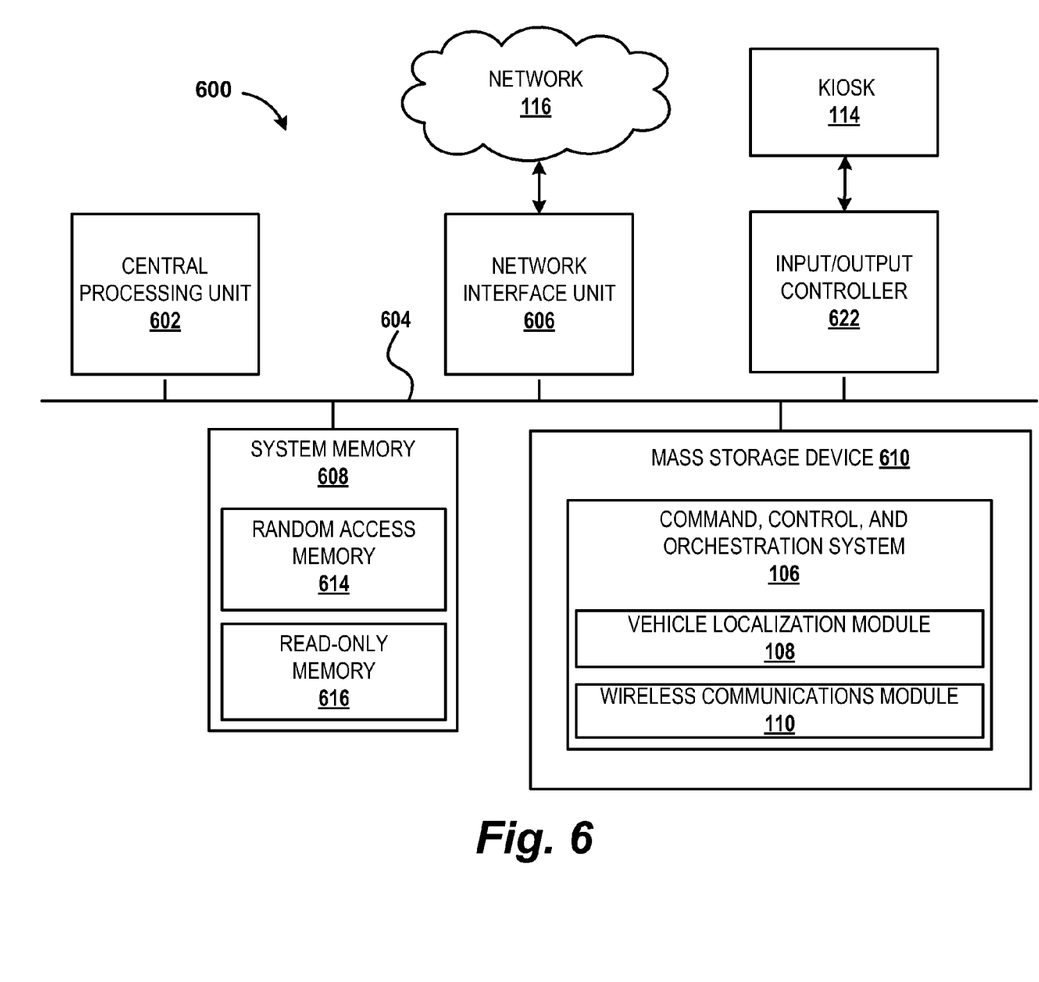
FIG. 6 is a computer architecture diagram showing an illustrative computer hardware architecture for a computing system capable of implementing aspects of the embodiments presented herein.

FIG. 6 shows an illustrative computer architecture 600 capable of executing the software components described herein for providing a trackless transit system and controlling adaptive trackless vehicles within that system in the manner presented above. The computer architecture 600 includes a central processing unit 602 (CPU), a system memory 608, including a random access memory 614 (RAM) and a read-only memory 616 (ROM), and a system bus 604 that couples the memory to the CPU 602. The CPU 602 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 600 also includes a mass storage device 610 for storing an operating system as well as specific application modules or other program modules, such as the CCOS 106, which includes the vehicle localization module 108 and the wireless communications module 110 described above in regard to FIG. 1. The mass storage device 610 is connected to the CPU 602 through a mass storage controller (not shown) connected to the bus 604. The mass storage device 610 and its associated computer-readable media provide non-volatile storage for the computer architecture 600. The computer architecture 600 may store data on the mass storage device 610 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 610 is characterized as primary or secondary storage, and the like. For example, the computer architecture 600 may store information to the mass storage device 610 by issuing instructions through the storage controller to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture 600 may further read information from the mass storage device 610 by detecting the physical states or characteristics of one or more particular locations within the physical storage units.

Although the description of computer-readable media contained herein refers to a mass storage device, such as a hard disk or CD-ROM drive, it should be appreciated by those skilled in the art that computer-readable media can be any available computer storage media that can be accessed by the computer architecture 600. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 600.

According to various embodiments, the computer architecture 600 may operate in a networked environment using logical connections to other aircraft systems and remote computers through a network, such as the network 116. The computer architecture 600 may connect to the network 116 through a network interface unit 606 connected to the bus 604. It should be appreciated that the network interface unit 606 may also be utilized to connect to other types of networks and remote computer systems.

The computer architecture 600 may also include an input-output controller 622 for receiving and processing input from a number of other devices, including the kiosks 114 or other user input device. Similarly, the input-output controller 622 may provide output to the kiosk 114 or other user output device.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An autonomous vehicle transit system for controlling vehicle movement of a plurality of trackless vehicles in the transit system, comprising:
   a controlled area in which the plurality of trackless vehicles operate;
   a command, control and orchestration system (CCOS); and
   a plurality of vehicle controllers, each vehicle controller associated with a trackless vehicle of the plurality of trackless vehicles and operative to communicate vehicle position information to the CCOS, to receive a navigation command, and to control the trackless vehicle according to the navigation command in a system controlled mode in the controlled area,
   wherein the CCOS is operative to provide navigation commands to the plurality of vehicle controllers to control movements of the plurality of trackless vehicles within the transit system according to vehicle position information received from the plurality of vehicle controllers, wherein at least one of the plurality of trackless vehicles is configured to enter and exit the controlled area and to operate in a driver controlled mode inside and outside the controlled area, and wherein the at least one of the plurality of trackless vehicles is further configured to switch from the driver controlled mode to the system controlled mode prior to entering the controlled area.

2. The transit system of claim 1, wherein a vehicle controller of the plurality of vehicle controllers is operative to determine the vehicle position information of the trackless vehicle associated with the vehicle controller using a position sensor associated with the trackless vehicle, and wherein the vehicle position information includes the current location of the trackless vehicle.

3. The transit system of claim 2, wherein the CCOS is operative to:
   determine a destination address of the trackless vehicle;
   determine a vehicle route on which to navigate the trackless vehicle from the current location to the destination address; and
   send, to the vehicle controller, navigation commands for navigating the trackless vehicle from the current location to the destination address according to the vehicle route.

4. The transit system of claim 3, further comprising a kiosk in the controlled area presenting a user interface to a user, wherein the CCOS is further operative to determine a destination address of the trackless vehicle comprises receiving a destination address from the user via the user interface presented on the kiosk.

5. The transit system of claim 2, further comprising a drive-by-wire module in communication with the vehicle controller and operative to control speed and direction of the trackless vehicle according to one or more navigation commands received by the vehicle controller,
wherein the vehicle controller is further operative to control the trackless vehicle according to the navigation command by sending an instruction to the drive-by-wire module for controlling the speed and direction of the trackless vehicle.

6. The transit system of claim 2, further comprising a perception sensor operative to perceive and communicate vehicle surroundings to the CCOS via the vehicle controller, and
wherein the CCOS is further operative to utilize the vehicle surroundings received from the perception sensor via the vehicle controller to dynamically update the vehicle route from the current location of the trackless vehicle to the destination address to avoid collisions with one or more trackless vehicles whose movements are also being controlled by the CCOS.

7. A method for controlling movement of trackless vehicles within an autonomous vehicle transit system, comprising:
operating the trackless vehicles in a driver controlled mode inside and outside a controlled area of the autonomous vehicle transit system;
switching from the driver controlled mode to a system controlled mode prior to entering the controlled area
sending a destination address for a trackless vehicle to a CCOS;
receiving, from the CCOS, at least one navigation command corresponding to navigating the trackless vehicle along a vehicle route from a current location to the destination address; and
upon receiving the at least one navigation command, executing the at least one navigation command such that the trackless vehicle is navigated within the controlled area along the vehicle route from the current location to the destination address.

8. The method of claim 7, further comprising projecting a location marker for allowing the CCOS to determine the current location of the trackless vehicle.

9. The method of claim 7, further comprising:
perceiving vehicle surroundings around the trackless vehicle;
communicating the vehicle surroundings to the CCOS for creation of an updated vehicle route according to the vehicle surroundings;
receiving an updated navigation command corresponding to the updated vehicle route; and
executing the updated navigation command such that the trackless vehicle is navigated along the updated vehicle route to the destination address.

10. The method of claim 7, wherein the navigation command comprises a steering instruction for controlling the direction of the trackless vehicle, an acceleration instruction for moving the trackless vehicle, a brake instruction for braking the trackless vehicle, or a gear instruction for selecting a drive gear or a reverse gear.

11. The method of claim 7, wherein switching the trackless vehicle from the driver controlled mode to the system controlled mode comprises activating a vehicle autonomy kit that when activated, is mechanically connected to one or more actuators controlling the trackless vehicle and operative to receive one or more navigation commands from the CCOs and to autonomously control the trackless vehicle to execute the one or more navigation commands, and that when deactivated, is mechanically disconnected from the one or more actuators of the trackless vehicle.

12. The method of claim 11, wherein activating the vehicle autonomy kit comprises:
powering on a communications port;
upon powering on the communications port, establishing a connection with the CCOS; and
sending a request to be controlled by the CCOS.

13. The method of claim 7, further comprising switching the vehicle from operating in the system controlled mode in which the trackless vehicle is controlled by the CCOS to the driver controlled mode in which the trackless vehicle is controlled by a driver in the controlled area.

14. A vehicle autonomy kit for navigating a trackless vehicle in a transit system, comprising:
a position sensor operative to track a current location of the trackless vehicle;
a vehicle perception sensor operative to perceive and communicate vehicle surroundings to a vehicle controller;
the vehicle controller operative to
send vehicle surroundings perceived by the vehicle perception sensor to a CCOS, and
receive navigation commands from the CCOS for navigating the trackless vehicle within a controlled area in a system controlled mode; and
a drive-by-wire module, in communication with the vehicle controller, and operative to control speed and direction of the trackless vehicle in the controlled area according to one or more navigation commands received by the vehicle controller, wherein the trackless vehicle is configured to enter and exit the controlled area and to operate in a driver controlled mode inside and outside the controlled area, and wherein the trackless vehicle is further configured to switch from the driver controlled mode to the system controlled mode prior to entering the controlled area.

15. The vehicle autonomy kit of claim 14, further comprising a communications port for receiving the navigation commands over a communications network.

16. The vehicle autonomy kit of claim 14, further comprising one or more actuators for controlling:
a steering component and a gear component for adjusting the direction of the trackless vehicle, and
an acceleration component and a brake component for adjusting the speed of the trackless vehicle.

17. The vehicle autonomy kit of claim 14, further comprising a switch for switching the trackless vehicle from the system controlled mode in which the trackless vehicle is controlled by commands received at the vehicle controller, and the driver controlled mode in which the trackless vehicle is controlled by a driver.

18. The vehicle autonomy kit of claim 14, further comprising a passenger sensor operative to sense and communicate if a passenger is within the trackless vehicle to the vehicle controller, wherein the vehicle controller is configured to present a user interface to the passenger when the passenger is within the trackless vehicle and wherein the passenger is permitted to use the user interface to send requests to the CCOS to route the trackless vehicle to a specific location within the controlled area.

19. The vehicle autonomy kit of claim 14, further comprising an input device operative to receive and communicate an input received by a passenger within the trackless vehicle.

20. The method of claim 7, wherein sending a destination address comprises sending a destination address from the trackless vehicle to the CCOS.

* * * * *